UNITED STATES PATENT OFFICE.

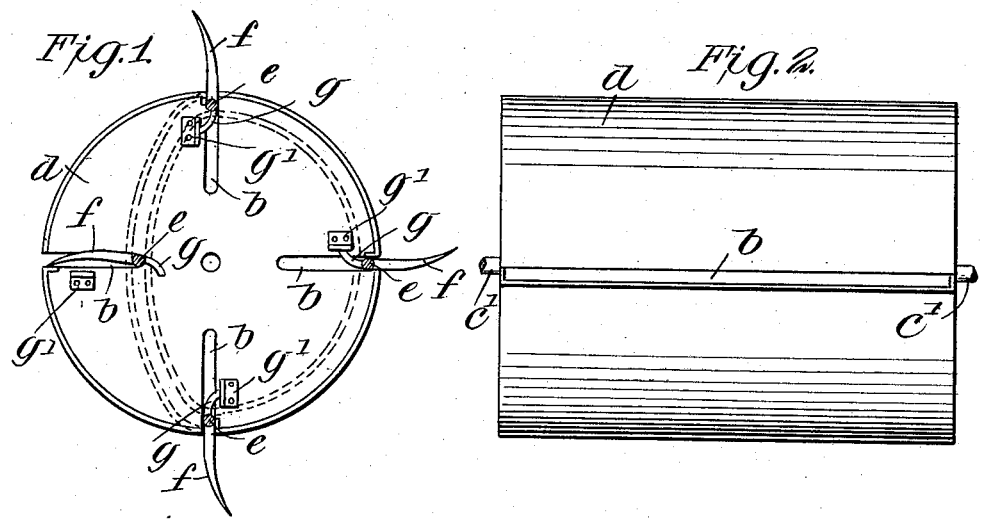
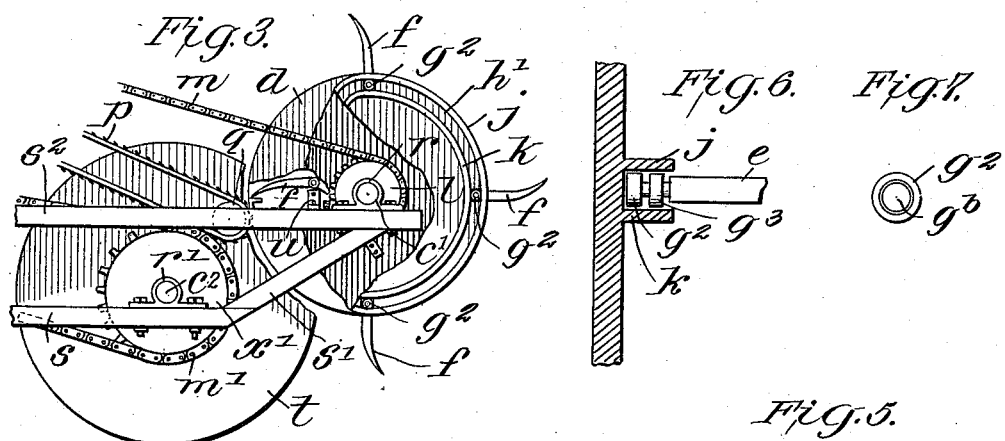
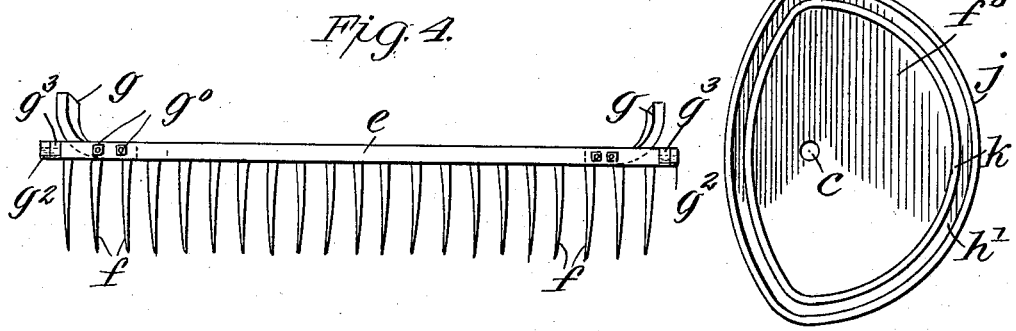

JOHN HETTRICH, OF LINCOLN, NEBRASKA.

CORN-HARVESTER.

1,014,473.  Specification of Letters Patent.   Patented Jan. 9, 1912.

Application filed May 10, 1909. Serial No. 495,001.

*To all whom it may concern:*

Be it known that I, JOHN HETTRICH, a citizen of the United States, and a resident of Lincoln, in the county of Lancaster and State of Nebraska, have made certain new and useful Improvements in Corn-Harvesters, of which the following is a specification.

My invention is an improvement in corn harvesters and consists in certain novel constructions and combinations of parts, hereinafter described and claimed.

The present invention is an improvement over my prior Patent, No. 917,606, bearing date of April 6, 1909, and the object of the invention is to eliminate the strain on the finger bars, and on the cam tracks in the said patent, and to permit the making of the cam tracks of uniform width, whereby to increase the wearing capacity and life of the machine and to decrease the power required to operate the same.

Referring to the drawings forming a part hereof:—Figure 1 is an end view of the drum, Fig. 2 is a front view of the drum, Fig. 3 is a fragmentary end view of the machine showing the device, Fig. 4 is a plan view of the finger bar, Fig. 5 is a face view of a cam, Fig. 6 is a section of the disk transverse to the cams, showing the end of the finger bar in place, and Fig. 7 is an end view of the finger bar.

The gathering device or gatherer, consists of a drum $d$ provided with a plurality of radial openings $b$, arranged at angles of 90 degrees with respect to each other and extending the full length of the drum. The drum is preferably made of sheet material bent into form and having a head at each end, and the slots $b$ are formed in the heads, and act as guideways or trackways for the finger bars. Each head of the drum is provided with an opening $c$ for receiving a shaft $c'$. Each of the finger bars as shown in Fig. 3, consists of a bar $e$ having at each end a reduced portion $g^b$ forming a spindle or journal pin. A plurality of rollers $g^2$ $g^3$ is journaled on each pin, the said rollers moving independently of each other and they may be held in position on the spindles in any suitable manner. Each finger bar $e$ is provided with a plurality of lateral fingers $f$, the said fingers curving slightly toward their free ends in the same direction as indicated in Fig. 1.

In the operation of the corn harvester forming the subject of the aforesaid patent, the fingers are projected from the drum during the greater portion of each rotation to collect the corn, and deliver it to the elevator $p$, the said elevator carrying the corn to husking rollers or other devices for husking the ears. In order that the drum may be arranged with its periphery as near as possible to the end of the elevator, the fingers are arranged to be retracted into the interior of the drum when the said fingers are passing the elevator. Were the fingers projected during the entire rotation of the drum, it would be necessary to space the drum a distance from the elevator corresponding to the length of the fingers in order that they might pass the same without interference. The finger bars are projected by means of cams $h'$, the said cams being formed on the faces of disks $f^0$, by means of ribs $j$ $k$ spaced apart from each other.

In the patent above mentioned, the ends of the finger bars engage the groove directly. In the present invention, the rollers $g^2$, $g^3$ engage the cams, thus eliminating a great amount of friction and absolutely eliminating any liability to bind the finger bars with the cam. The above result is attained by arranging the rollers in sections, a pair of rollers on each spindle. It will be evident that should the finger bar become twisted or inclined with respect to the walls of the cam, so that one portion of the end of the bar engages one wall and the other portion the other wall, the finger bars would jam, thus causing great strain on the device. With the rollers arranged as specified, such binding could not take place, for one roller would turn with the one wall, and the other roller would turn in the opposite direction with the other wall.

The finger bars are held in position with the fingers radially to the drum, by means of brackets $g$, one of which is secured to each end of the finger bar by bolts $g^0$. The connection of the brackets is near to the end of the bar, and the free ends of the brackets are bent at substantially a right angle with respect to the length of the bar, and in such position that the outer face of each bracket is substantially flush with the shoulder formed between the journal pin and the finger bar. When the finger bars are pushed outwardly as shown at the right of Fig. 1, the ends of the brackets engage lugs or stops $g'$ secured to the drum near the ends of the radial slots $b$. The engagement of the brackets with the lugs locks the finger bar with the fingers radial to the drum. It will be evident that the improvement assists in eliminating friction and in preventing injury to the finger bars, drum or cams.

The shaft $c'$ is journaled in bearings $r$ on a bar $s^2$ of the frame of the machine, a portion of which is shown in Fig. 3. A sprocket wheel $l$ is secured to the shaft at one end, and a sprocket chain $m$ engages the wheel for operating the drum. The wheel $t$ supports the rear of the machine, and the said wheel is provided with a shaft $c^2$, journaled in bearings $r'$ on a bar $s$ of the frame, the said bar being connected to the bar $s^2$ by an inclined bar $s'$. A sprocket wheel $x'$ is secured to the shaft $r'$ and a sprocket chain $m'$ runs on the said sprocket wheel. The elevator $p$ is supported on a roller $q$ journaled on the bar $s^2$. The cam disk $f^0$ is attached to the frame by means of brackets $u$.

Having thus described my invention, what I claim as new and desire to secure by Letters Patent is:—

1. In a corn harvester or like machine, a rotatory gathering drum, a drum head at each end of said drum, said drum heads being provided with radial slots, stationary cam trackways, one of said cam track ways being positioned at each end of the gathering drum, finger bars, said finger bars having each end adapted to project through a radial slot in the drum head and into and engage the cam track way and receive motion from each as the gathering drum rotates, ring bearings on the ends of said finger bars, gathering fingers, said fingers being attached to the finger bar, finger bar holders, said holders comprising a curved strip of metal attached to and near each end of the finger bar and a metal lug, attached to the inner face of each drum head, positioned and adapted to engage the end of the finger bar holder and lock the finger bar with the gathering fingers rigidly projecting from the gathering drum and alternately release same and permit the retraction of the gathering fingers within the drum as the projecting ends of the finger bars are moved through the outer and the inner portions of the cam orbit respectively by the radial slots in the heads of the rotating drum.

2. In a corn harvester or like machine, in combination, a gathering drum mounted upon an axle, a stationary cam trackway positioned at each end of said drum, radial slots in each head of said drum, a finger bar with gathering fingers mounted thereon, means of holding the finger bar and gathering fingers thereon rigidly in position for work and releasing the same as they are retracted within the drum, said means consisting of a finger bar support, said support comprising a strip of metal attached to and near each end of the finger bar and curving outwardly and rearwardly therefrom and adapted to strike against a metal lug, one of said lugs being positioned and attached to the inner face of each of said drum heads so as to guide and lock the finger bar support and thereby the finger bar with the gathering fingers thereon rigidly projecting in working position from said gathering drum and to release the said finger bar support, the finger bar and fingers thereon as the same are retracted within the drum, a machine frame, and a source of power with connections thereto substantially as described.

3. In a corn harvester, a drum provided with radial guideways, a finger bar having gathering fingers movable in each of the guideways, each bar having near its respective ends a support extending rearwardly from the bar, the drum having a lug for engagement by each support to hold the fingers of the bar radial to the drum when the said finger bar is at the periphery of the drum.

In testimony whereof, I have signed my name to this specification in the presence of two subscribing witnesses.

JOHN HETTRICH.

Witnesses:
  IRA F. BAKER,
  M. L. EASTERDAY.

---

Copies of this patent may be obtained for five cents each, by addressing the "Commissioner of Patents, Washington, D. C."